(12) United States Patent
Tanaka et al.

(10) Patent No.: US 12,489,853 B2
(45) Date of Patent: Dec. 2, 2025

(54) INFORMATION PROCESSING APPARATUS AND IMAGE FORMING APPARATUS WITH ADAPTIVE DIAGNOSTIC IMAGE LAYOUT BASED ON RECORDING MEDIUM SIZE

(71) Applicant: FUJIFILM Business Innovation Corp., Tokyo (JP)

(72) Inventors: Yuki Tanaka, Kanagawa (JP); Shinya Miyamori, Kanagawa (JP); Masashi Morimoto, Kanagawa (JP); Shinsuke Sugi, Kanagawa (JP); Kyotaro Tomoda, Kanagawa (JP); Tomokazu Sugata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 29 days.

(21) Appl. No.: 18/423,760

(22) Filed: Jan. 26, 2024

(65) Prior Publication Data

US 2024/0171687 A1    May 23, 2024

Related U.S. Application Data

(62) Division of application No. 17/903,742, filed on Sep. 6, 2022, now Pat. No. 11,924,384.

(30) Foreign Application Priority Data

Mar. 28, 2022    (JP) .................. 2022-051988

(51) Int. Cl.
*H04N 1/00*    (2006.01)
*H04N 1/23*    (2006.01)

(52) U.S. Cl.
CPC ..... *H04N 1/00045* (2013.01); *H04N 1/00015* (2013.01); *H04N 1/00029* (2013.01); *H04N 1/00079* (2013.01); *H04N 1/00092* (2013.01); *H04N 1/00244* (2013.01); *H04N 1/2323* (2013.01); *H04N 2201/0091* (2013.01)

(58) Field of Classification Search
CPC ...... H04N 1/00002–00092; H04N 1/603–605; G06K 15/027; G06F 3/1256
See application file for complete search history.

(56) References Cited

U.S. PATENT DOCUMENTS 7,486,414 B2 *    2/2009    Arai ................... H04N 21/6582
                                              358/1.9
9,135,538 B2 *    9/2015    Isokawa ............. H04N 1/00023
(Continued)

FOREIGN PATENT DOCUMENTS

JP    6223167 B2    11/2017
JP    6566794 B2    8/2019

*Primary Examiner* — Scott A Rogers
(74) *Attorney, Agent, or Firm* — Oliff PLC

(57) ABSTRACT

An information processing apparatus includes a processor configured to: acquire a read image resulting from reading a recording medium where a diagnostic image to be used to diagnose an image forming apparatus is formed; acquire, from the read image, an image read portion of the recording medium from which the diagnostic image is read and one specific portion of a non-formation read portion, the non-formation read portion resulting from reading a non-formation portion of the recording medium where the diagnostic image is not formed; and output the image read portion and the one specific portion.

4 Claims, 12 Drawing Sheets

(56) References Cited

U.S. PATENT DOCUMENTS

| | | |
|---|---|---|
| 9,282,199 B2 | 3/2016 | Hashizume |
| 9,724,950 B2 | 8/2017 | Kasahara |
| 9,930,191 B2 | 3/2018 | Fujiki |
| 9,986,106 B2 * | 5/2018 | Tominaga ............ H04N 1/6033 |
| 10,009,515 B2 | 6/2018 | Kishi |
| 10,187,532 B2 | 1/2019 | Matsuzaki |
| 10,486,422 B2 | 11/2019 | Urushidani |
| 11,258,920 B2 | 2/2022 | Yoshida |
| 11,582,354 B2 | 2/2023 | Hirayama |
| 11,736,625 B1 | 8/2023 | Sugi et al. |
| 2008/0204816 A1 * | 8/2008 | Miyazaki ............ H04N 1/6033 |
| | | 358/406 |
| 2018/0359380 A1 * | 12/2018 | Itagaki ............... G03G 15/0848 |
| 2022/0116504 A1 | 4/2022 | Tsukamoto |

* cited by examiner

INFORMATION PROCESSING APPARATUS AND IMAGE FORMING APPARATUS WITH ADAPTIVE DIAGNOSTIC IMAGE LAYOUT BASED ON RECORDING MEDIUM SIZE

CROSS-REFERENCE TO RELATED APPLICATIONS

This application is a divisional of U.S. application Ser. No. 17/903,742 filed on Sep. 6, 2022, which is based on and claims priority under 35 USC 119 from Japanese Patent Application No. 2022-051988 filed Mar. 28, 2022, the disclosures of which are incorporated herein by reference in their entireties.

BACKGROUND

(i) Technical Field

The present disclosure relates to an information processing apparatus and an image forming apparatus.

(ii) Related Art

Japanese Patent No. 6223167 discloses an image forming apparatus that prints a predetermined test chart responsive to a type of a defect of an image serving as an analysis target and transmits the printed test chart as read image data to another apparatus.

To diagnose the image forming apparatus, an amount of information used for diagnosis may be smaller from the standpoint of shorter processing time. For example, the amount of information used for diagnosis may be reduced by deleting part of the read image obtained for diagnosis.

On the other hand, if part of the read image obtained for diagnosis is deleted, the accuracy of diagnosis may be degraded.

SUMMARY

Aspects of non-limiting embodiments of the present disclosure relate to not only reducing an amount of information on a read image that results from reading a recording medium having a diagnostic image used to diagnose an image forming apparatus but also ensuring the accuracy of diagnosis on the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire a read image resulting from reading a recording medium where a diagnostic image to be used to diagnose an image forming apparatus is formed; acquire, from the read image, an image read portion of the recording medium from which the diagnostic image is read and one specific portion of a non-formation read portion, the non-formation read portion resulting from reading a non-formation portion of the recording medium where the diagnostic image is not formed; and output the image read portion and the one specific portion.

BRIEF DESCRIPTION OF THE DRAWINGS

Exemplary embodiment of the present disclosure will be described in detail based on the following figures, wherein.

DETAILED DESCRIPTION

Exemplary embodiment of the disclosure is described with reference to the drawings.

Figure 1:
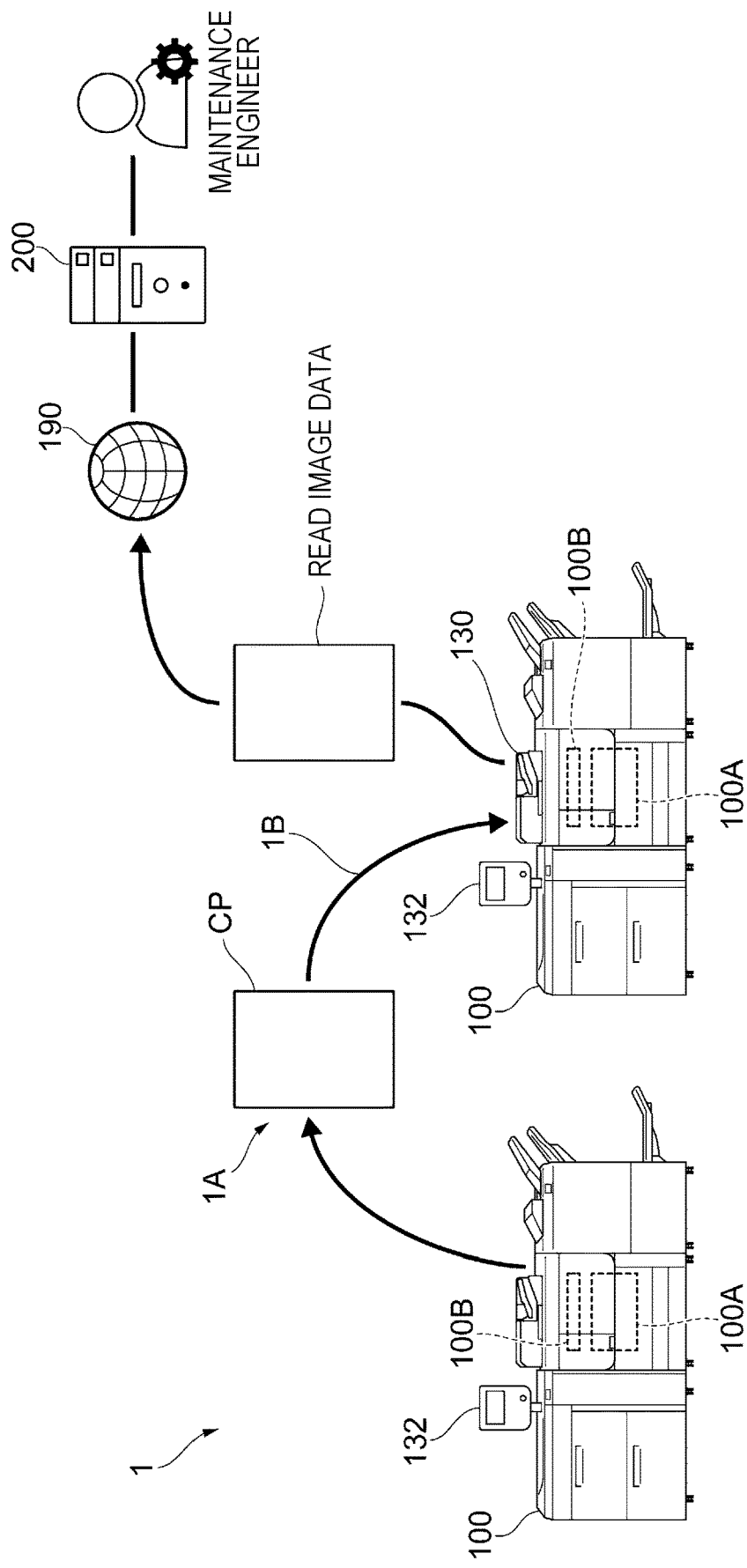
FIG. 1 illustrates an example of an information processing system.

FIG. 1 illustrates an example of an information processing system 1.

The information processing system 1 of the exemplary embodiment includes multiple image forming apparatuses 100, and a server apparatus 200 that is an external apparatus connected to each of the image forming apparatuses 100 via a communication network 190. According to the exemplary embodiment, the server apparatus 200 diagnoses the image forming apparatus 100.

FIG. 1 illustrates one of the image forming apparatuses 100.

The image forming apparatus 100 includes an image forming unit 100A serving as an image former that forms an image on a paper sheet as an example of a recording medium.

The image forming unit 100A forms an image on the paper sheet through an ink-jet system or an electrophotographic system. The formation of the image by the image forming unit 100A is not limited to the ink-jet system or the electrophotographic system and may be performed through another system.

The image forming apparatus 100 also includes an information processing apparatus 100B and the information processing apparatus 100B performs a variety of operations of the image forming apparatus 100 as described below.

Figure 2:
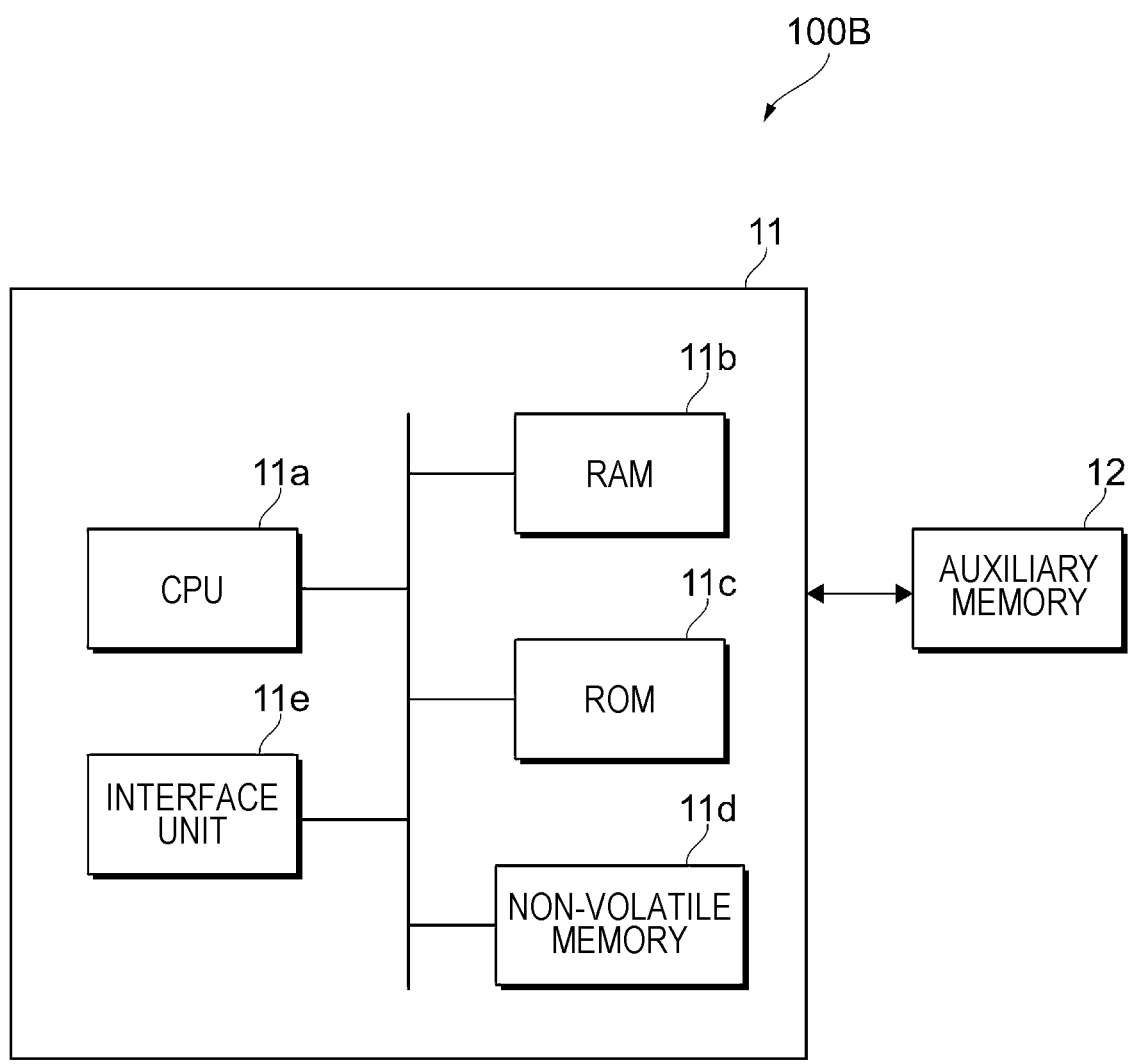
FIG. 2 illustrates a hardware configuration of an information processing apparatus in an image forming apparatus.

FIG. 2 illustrates a hardware configuration of the information processing apparatus 100B in the image forming apparatus 100. The information processing apparatus 100B in the image forming apparatus 100 may be implemented by a computer.

The information processing apparatus 100B includes an arithmetic unit 11 that performs arithmetic operations in accordance with a program and an auxiliary memory 12 that stores files and the like.

The auxiliary memory 12 may be implemented by a commercially available information storage, such as a hard disk drive (HDD) or semiconductor memory.

The processor 11 includes a central processing unit (CPU) 11a serving as a processor.

The arithmetic unit 11 also includes a random-access memory (RAM) 11b serving as an working memory for the CPU 11a, and a read-only memory (ROM) 11c storing a program executed by the CPU 11a.

The arithmetic unit 11 further includes a non-volatile memory 11d and an interface unit 11e. The non-volatile memory 11*d* is rewritable and continues to store data even when power supplying is interrupted. The interface unit 11*e* controls a communication unit connected to the arithmetic unit 11.

The non-volatile memory 11*d* includes a flash memory or a static RAM (SRAM) backed up by a battery. The auxiliary memory 12 stores a file and a program executed by the arithmetic unit 11.

According to the exemplary embodiment, the CPU 11*a* in the arithmetic unit 11 reads the program from the auxiliary memory 12 and thus performs a variety of processes.

The program to be executed by the CPU 11*a* may be delivered to the information processing apparatus 100B in a stored state on a computer readable storage medium, such as a magnetic recording medium (such as magnetic tape or magnetic disk), optical recording medium (such an optical disk), magnetooptical recording medium, or semiconductor memory. The program to be executed by the CPU 11*a* may also be delivered to the information processing apparatus 100B via a communication medium, such as the Internet.

Out of processes described below, a process to be performed by the image forming apparatus 100 is performed by the CPU 11*a* serving as an example of a processor in the image forming apparatus 100.

Figure 3:
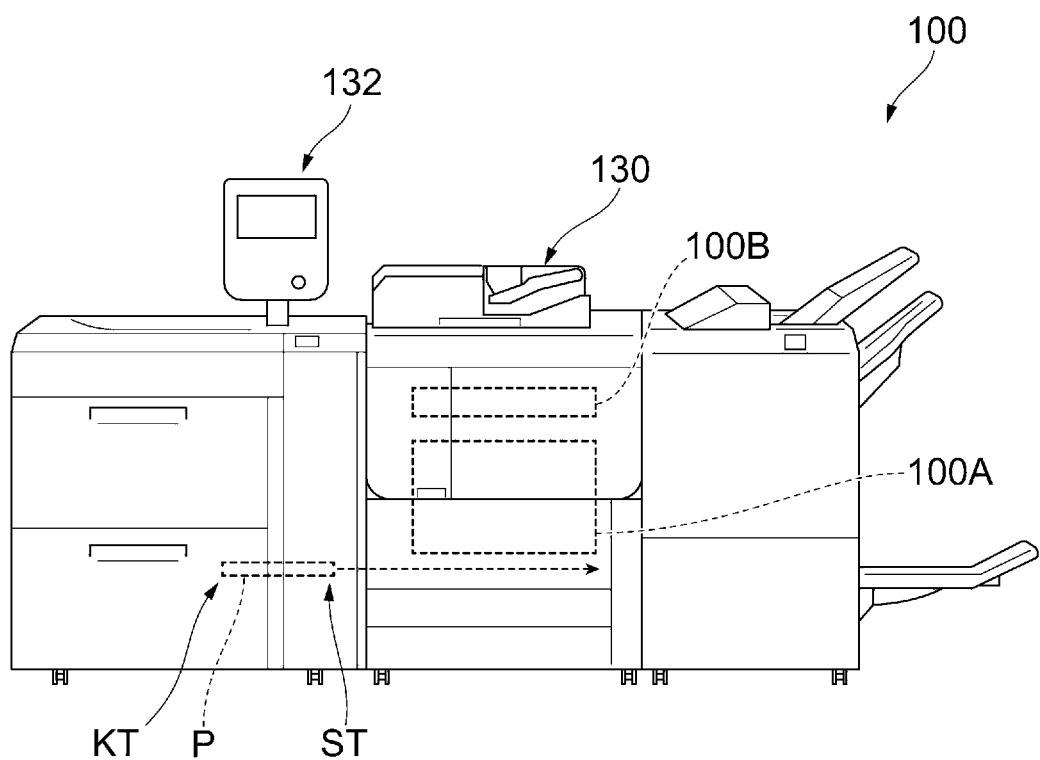
FIG. 3 illustrates the image forming apparatus.

FIG. 3 illustrates the image forming apparatus 100.

According to the exemplary embodiment, the image forming apparatus 100 includes the image forming unit 100A that forms an image on a paper sheet P serving as an example of a recording medium.

According to the exemplary embodiment, when the paper sheet P passes by the image forming unit 100A with one side of the paper sheet P facing the image forming unit 100A. The image forming unit 100A then forms an image onto the paper sheet P.

The image forming apparatus 100 includes an image reading device 130 as an image reader that reads an image formed on the paper sheet P serving as a recording medium.

The image reading device 130 is a scanner having a transport function to transport the paper sheet P. The image reading device 130 includes a light source radiating light onto the paper sheet P and a light receiver such as a charge coupled device (CCD) that receives light reflected from the paper sheet P. According to the exemplary embodiment, read image data described below is generated from the reflected light received by the light receiver.

Referring to FIG. 3, the image reading device 130 is arranged in the top portion of the image forming apparatus 100. The image reading device 130 successively reads images of the paper sheets P set by a user.

The mounting location of the image reading device 130 is not limited to the top portion of the image forming apparatus 100. The image reading device 130 may be mounted in a transport passage of the paper sheet P within the image forming apparatus 100.

In such a case, the paper sheets P having images that are formed thereon by the image forming unit 100A successively pass through the image reading device 130. During the pass of the paper sheets P, the images on the paper sheets P are successively read.

Each of the image forming apparatuses 100 includes an operation receiver 132 that receives an operation of a user. The operation receiver 132 includes a touch panel. The operation receiver 132 displays information to the user while receiving the operation of the user.

According to the exemplary embodiment, the displaying of the information to the user and the receiving of the operation of the user are performed by the operation receiver 132. Alternatively, an operation receiver and an information display may be separately arranged.

Each of the image forming apparatuses 100 has an information transmission function to transmit information to the server apparatus 200.

According to the exemplary embodiment, in order to diagnose the image forming apparatus 100, a chart image is formed first onto the paper sheet P by operating the image forming unit 100A.

A chart paper sheet CP 1A serving as a paper sheet P having a chart image (not illustrated in FIG. 1) as an example of a diagnostic image is generated as illustrated in FIG. 1.

The chart image is used to diagnose the image forming unit 100A arranged in the image forming apparatus 100. According to the exemplary embodiment, the chart paper sheet CP as the paper sheet P having the chart image used for diagnosis is generated.

When the chart paper sheet CP is generated, the image reading device 130 as the example of the image reader is used to read the chart paper sheet CP with the chart image formed thereon as illustrated by an arrow 1B in FIG. 1.

The read image data is thus generated as an example of an image that results from reading the chart paper sheet CP.

According to the exemplary embodiment, the image forming apparatus 100 transmits the read image data to the server apparatus 200 and is then stored onto the server apparatus 200.

The server apparatus 200 diagnoses the image forming apparatus 100 and image reading device 130 in accordance with the read image data.

A maintenance engineer maintaining the image forming apparatus 100 accesses the server apparatus 200, references the read image data stored on the server apparatus 200 and diagnosis results provided by the server apparatus 200, and thus diagnoses the image forming apparatus 100 and image reading device 130.

According to the exemplary embodiment, settings set on the image forming unit 100A in the image forming apparatus 100 may be modified as appropriate automatically or manually. In other words, the settings related to image forming may be newly set.

The image forming unit 100A in the image forming apparatus 100 is adjusted, possibly leading to an improvement in image quality.

FIGS. 4 and 5A through 5C illustrate a process that is performed by the CPU 11*a* in the image forming apparatus 100.

Figure 4:
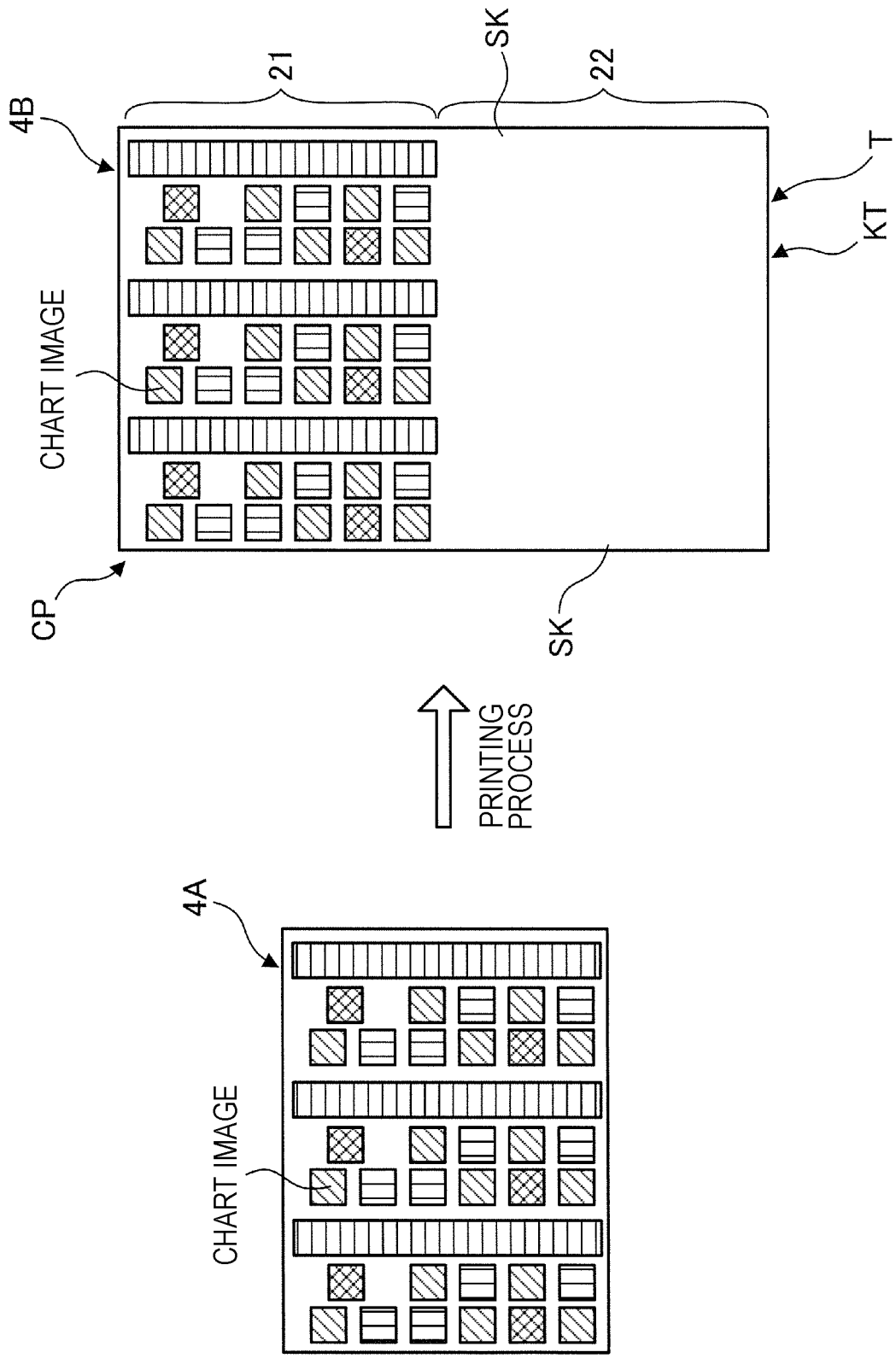
FIG. 4 illustrates a process performed by a central processing unit (CPU) in the image forming apparatus.

According to the exemplary embodiment, the auxiliary memory 12 in the image forming apparatus 100 (see FIG. 2) stores beforehand a chart image 4A of the A4 size in FIG. 4. Specifically, the auxiliary memory 12 stores beforehand the image data of the chart image of the A4 size.

In this process example, the image forming apparatus 100 (see FIG. 1) forms the chart image of the A4 size onto a paper sheet of the A3 size. The chart paper sheet CP of the A3 size is generated as denoted by 4B in FIG. 4.

In this process example, the chart image of the A4 size is formed on the paper sheet P of the A3 size. The chart paper sheet CP of the A3 size is thus generated.

The chart paper sheet CP includes a formation portion 21 where the chart image is formed and a non-formation portion 22 where the chart image is not formed.

According to the exemplary embodiment, the chart paper sheet CP of the A3 size with the chart image formed thereon is read by the image reading device 130 (see FIG. 1).

Figure 5A:
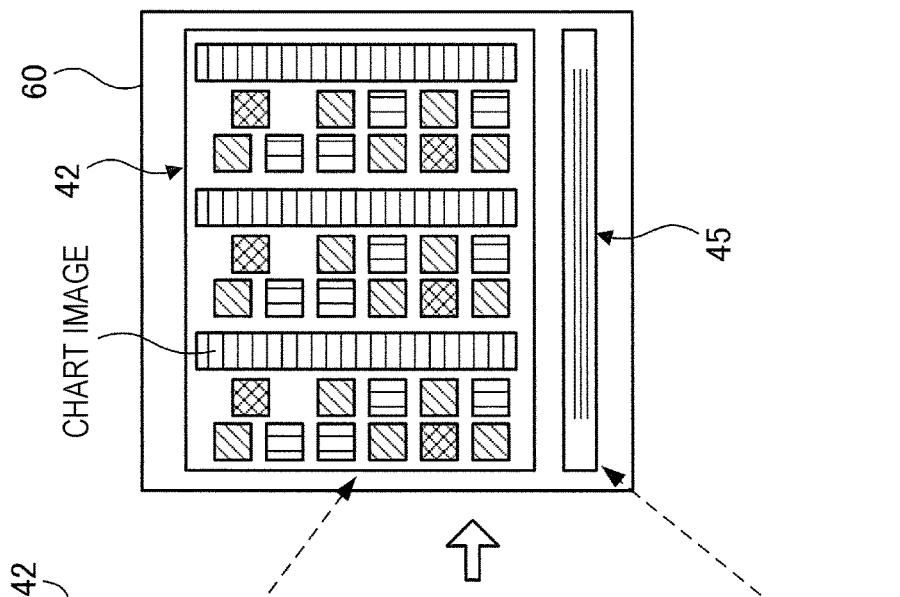
FIGS. 5A through 5C illustrate a process performed by the CPU in the image forming apparatus.

Referring to FIG. 5A, read image data 5B is generated by reading the chart paper sheet CP of the A3 size.

When the read image data 5B is generated, the CPU 11a in the information processing apparatus 100B (see FIG. 2) acquires the read image data 5B.

Upon acquiring the read image data 5B, the CPU 11a determines whether the size of the chart paper sheet CP estimated from the read image data 5B is larger than a predetermined size. For example, the predetermined size may be the A4 size.

Figure 5B:
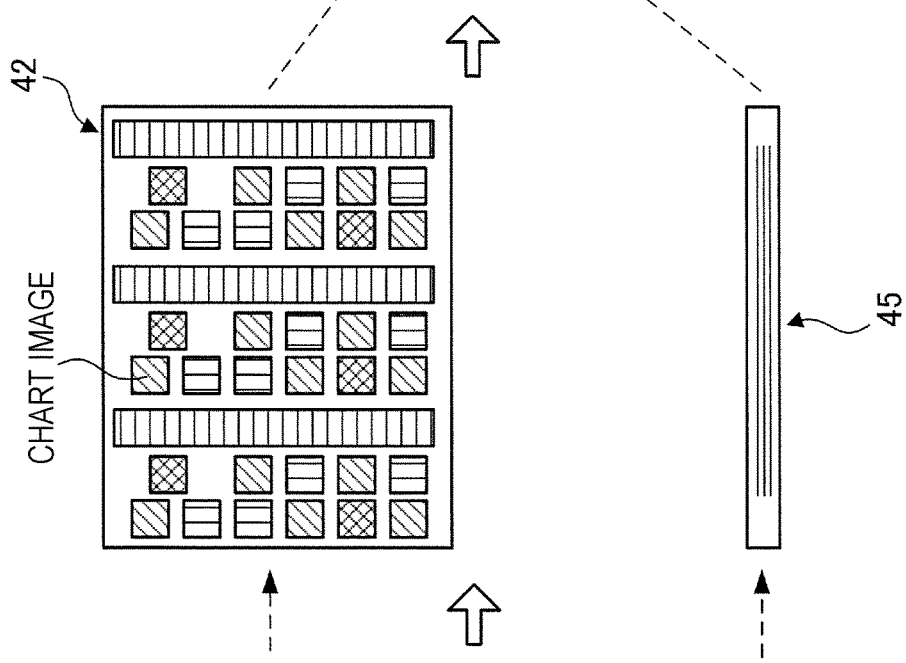

If the CPU 11a determines that the size of the chart paper sheet CP is larger than the predetermined size, the CPU 11a performs image extraction. As illustrated in FIG. 5B, the CPU 11a acquires an image read portion 42 that results from reading the chart image.

The CPU 11a also performs image extraction, thereby acquiring one specific portion 45 of a non-formation read portion 44 that results from reading the non-formation portion 22 (see FIG. 4).

According to the exemplary embodiment, if the size of the chart paper sheet CP identified by the read image data 5B is equal to or smaller than the predetermined size, the arithmetic unit 11 does not perform the operation to acquire the image read portion 42 and one specific portion 45 from the read image data 5B.

Specifically, if the size of the chart paper sheet CP identified by the read image data 5B is equal to or smaller than the A4 size, the operation to acquire the image read portion 42 and one specific portion 45 from the read image data 5B is not performed.

In such a case, the read image data 5B acquired by the image reading device 130 is transmitted as is to the server apparatus 200.

Figure 5C:
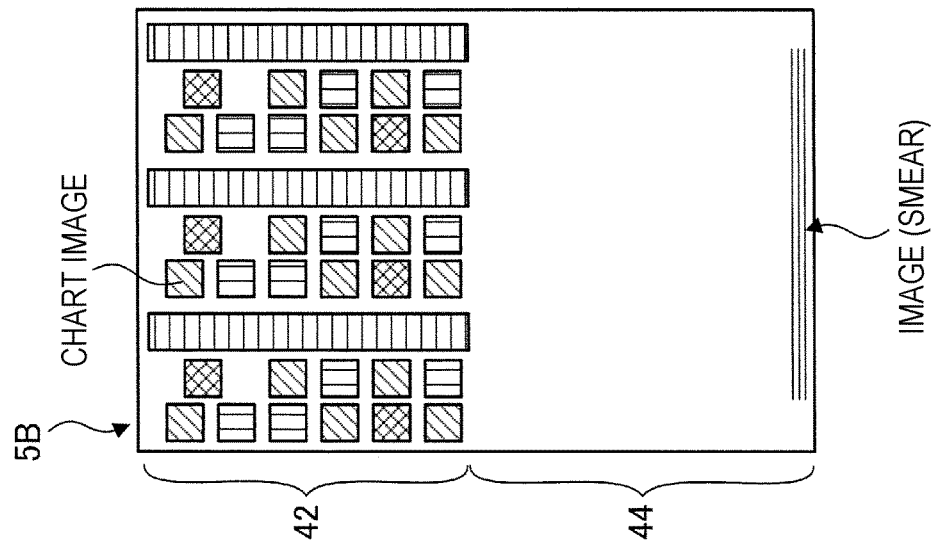

Referring to FIG. 5C, the CPU 11a generates a synthesis image 60 that is a combination of the acquired image read portion 42 and one specific portion 45.

The CPU 11a outputs the image read portion 42 and one specific portion 45. Specifically, in order to output the image read portion 42 and one specific portion 45, the CPU 11a outputs the synthesis image 60.

In this way, the synthesis image 60 is output to the server apparatus 200. In other words, the image read portion 42 and one specific portion 45 are output to the server apparatus 200.

As described above, if the size of the chart paper sheet CP identified by the read image data 5B is larger than the A4 size as a specific size, the image read portion 42 and one specific portion 45 from the read image data 5B are acquired.

The disclosure is not limited to the above case. For example, if the size of the chart paper sheet CP identified by the read image data 5B is larger than the minimum size that still allows the chart image to be formed therewithin, the image read portion 42 and one specific portion 45 may be acquired.

In this process example, the minimum size of the paper sheet P that still allows the chart image to be formed therewithin is the A4 size. In this process example, the size of the chart paper sheet CP identified by the read image data 5B is the A3 size larger than the A4 size.

In this case, the CPU 11a acquires the image read portion 42 and one specific portion 45 from the read image data 5B.

On the other hand, if the size of the chart paper sheet CP identified by the read image data 5B is the minimum size, the CPU 11a does not acquire the image read portion 42 and one specific portion 45 and outputs the read image data 5B as is.

If the chart image is formed on the paper sheet P of the A4 size and the size of the chart paper sheet CP identified by the read image data 5B is the A4 size, the CPU 11a does not perform the acquisition operation of the image read portion 42 and one specific portion 45. In such a case, the CPU 11a outputs the read image data 5B as is.

The read image data 5B acquired by the image reading device 130 is transmitted in the unchanged original size thereof to the server apparatus 200.

In order to acquire the one specific portion 45, the CPU 11a acquires as the one specific portion 45 a portion that results from reading an end portion T of the chart paper sheet CP (see FIG. 4) of the non-formation read portion 44 (see FIG. 5A).

The one specific portion 45 illustrated in FIG. 5B results from reading the end portion T of the chart paper sheet CP (see FIG. 4) out of the non-formation read portion 44.

According to the exemplary embodiment, the portion that results from reading the end portion T is acquired in order to acquire the one specific portion 45 from the non-formation read portion 44.

Specifically, the CPU 11a acquires, as the one specific portion 45, the portion that results from reading a trailing end portion KT of the chart paper sheet CP (see FIG. 4).

According to the exemplary embodiment, when the image forming unit 100A (see FIG. 3) forms the chart image on the paper sheet P, the chart image is formed in a leading end portion ST in the transport direction of the paper sheet P and the non-formation portion 22 (see FIG. 4) is formed in the trailing end portion KT in the transport direction of the paper sheet P.

The CPU 11a acquires as the one specific portion 45 a portion that results from reading the trailing end portion KT of the chart paper sheet CP out of the non-formation read portion 44 (see FIG. 5A) acquired by reading the non-formation portion 22.

The read image data 5B (see FIG. 5A) is thus acquired. The CPU 11a analyzes the read image data 5B and then identifies, in accordance with a density value of each pixel, the image read portion 42 that results from reading the chart image and the non-formation read portion 44 that results from reading the non-formation portion 22.

In accordance with the identified non-formation read portion 44, the CPU 11a identifies the one specific portion 45 that results from reading the trailing end portion KT.

The CPU 11a extracts data from the read image data 5B and thus acquires the image read portion 42 and one specific portion 45 as illustrated in FIG. 5B. In accordance with the acquired image read portion 42 and one specific portion 45, the CPU 11a generates and outputs the synthesis image 60 as illustrated in FIG. 5C.

According to the exemplary embodiment, the synthesis image 60 is transmitted from the image forming apparatus 100 to the server apparatus 200.

The identifying of the image read portion 42 and non-formation read portion 44 (see FIG. 5A) may be performed in accordance with information that is attached to the chart paper sheet CP and included in the read image data 5B obtained as a result of reading the chart paper sheet CP.

Specifically, when the chart paper sheet CP is generated by forming the chart image on the paper sheet P, a code image, such as a one-dimensional barcode or two-dimensional barcode, is formed together with the chart image on the chart paper sheet CP.

The code image includes position information on a position of the chart image. Specifically, the code image includes information indicative of a positional relationship between the position of the code image and the chart image.

The CPU 11a analyzes the code image included in the read image data 5B and acquires the information indicative of the positional relationship included in the code image.

The CPU 11a identifies the position of the image read portion 42 in accordance with the information indicative of the positional relationship and the position of the code image included in the read image data 5B. The CPU 11a identifies the position of the non-formation read portion 44 in accordance with the position of the identified image read portion 42.

As described above, the CPU 11a acquires the identified image read portion 42 from the read image data 5B and acquires the one specific portion 45 from the identified non-formation read portion 44.

When the process illustrated in FIGS. 5A through 5C is performed, an amount of information to be transmitted to the server apparatus 200 may be reduced in comparison with when all the read image data 5B is transmitted to the server apparatus 200.

When the process illustrated in FIG. 5A through 5C is performed, the read image data on the trailing end portion KT of the chart paper sheet CP likely to be affected by a defect on the image forming unit 100A is transmitted to the server apparatus 200.

The server apparatus 200 and the maintenance engineer diagnose the image forming apparatus 100 and image reading device 130 in accordance with the read image data on the image read portion 42 and the read image data on the one specific portion 45.

If the user forms the chart image of the A4 size on the paper sheet P of the A3 size larger than the A4 size or only the paper sheets P of the A3 size are stacked in the image forming apparatus 100, the non-formation read portion 44 is included in the read image data 5B of the chart paper sheet CP.

In other words, the read image data 5B includes the non-formation read portion 44 that is obtained by reading a blank portion of the chart paper sheet CP.

If the read image data 5B is transmitted as is to the server apparatus 200, the read image data 5B including information not used for the diagnosis of the image forming apparatus 100 is transmitted to the server apparatus 200.

If the non-formation read portion 44 is deleted and is thus not transmitted to the server apparatus 200, an amount of information to be transmitted to the server apparatus 200 may be decreased.

On the other hand, the read image data that results from reading the trailing end portion KT of the chart paper sheet CP is not transmitted to the server apparatus 200.

The accuracy of diagnosing the image forming apparatus 100 is decreased in comparison with when the read image data obtained by reading the trailing end portion KT is transmitted to the server apparatus 200.

According to the exemplary embodiment, the non-formation read portion 44 is basically not transmitted but the one specific portion 45 included in the non-formation read portion 44 is transmitted to the server apparatus 200.

In this case, the amount of information to be transmitted to the server apparatus 200 is restricted while the accuracy of diagnosing the image forming apparatus 100 is still maintained.

According to the exemplary embodiment, when the image read portion 42 and one specific portion 45 are transmitted, the CPU 11a generates, as illustrated in FIG. 5C, the synthesis image 60 that is the combination of the image read portion 42 and one specific portion 45. In order to output the image read portion 42 and one specific portion 45, the CPU 11a outputs the synthesis image 60.

In other words, according to the exemplary embodiment, the CPU 11a generates one synthesis image 60 in which the image read portion 42 is associated with the one specific portion 45 and then outputs the synthesis image 60. The one synthesis image 60 is thus transmitted to the server apparatus 200.

According to the exemplary embodiment, when the image reading device 130 reads multiple chart paper sheets CP, the CPU 11a associates the image read portion 42 with the one specific portion 45 on a per chart paper sheet CP basis and thus generates one synthesis image 60 for each chart paper sheet CP.

Without generating the synthesis image 60, the CPU 11a may associate common identification information with each of the image read portion 42 and one specific portion 45.

Before outputting the image read portion 42 and one specific portion 45, the CPU 11a associates the common identification information with the image read portion 42 and one specific portion 45.

In this case, the image read portion 42 and one specific portion 45 associated with the common identification information are output to the server apparatus 200.

When the common identification information is associated with the image read portion 42 and one specific portion 45 acquired from each paper sheet CP, the CPU 11a differentiates the identification information from chart paper sheet CP to chart paper sheet CP.

The CPU 11a associates the common identification information with the image read portion 42 and one specific portion 45 acquired from each chart paper sheet CP and differentiates, from chart paper sheet CP to chart paper sheet CP, the common identification information associated with the image read portion 42 and one specific portion 45.

The image read portion 42 and one specific portion 45 may be acquired from each chart paper sheet CP in accordance with the read image data 5B respectively acquired from the chart paper sheets CP.

The CPU 11a associates the common identification information with the image read portion 42 and one specific portion 45 acquired from each chart paper sheet CP and then differentiates, from chart paper sheet CP to chart paper sheet, the common identification information to be associated with the image read portion 42 and one specific portion 45.

As described above, the one specific portion 45 with the read image data thereof transmitted to the server apparatus 200 is a portion that results from reading the trailing end portion KT of the chart paper sheet CP. The one specific portion 45 may be a portion that results from reading another portion of the chart paper sheet CP.

Specifically, the one specific portion 45 is the portion that results from reading a side end portion SK of the chart paper sheet CP (see FIG. 4) out of the non-formation read portion 44 (see FIG. 5A). The one specific portion 45 resulting from reading the side end portion SK may be transmitted to the server apparatus 200.

Figure 10:
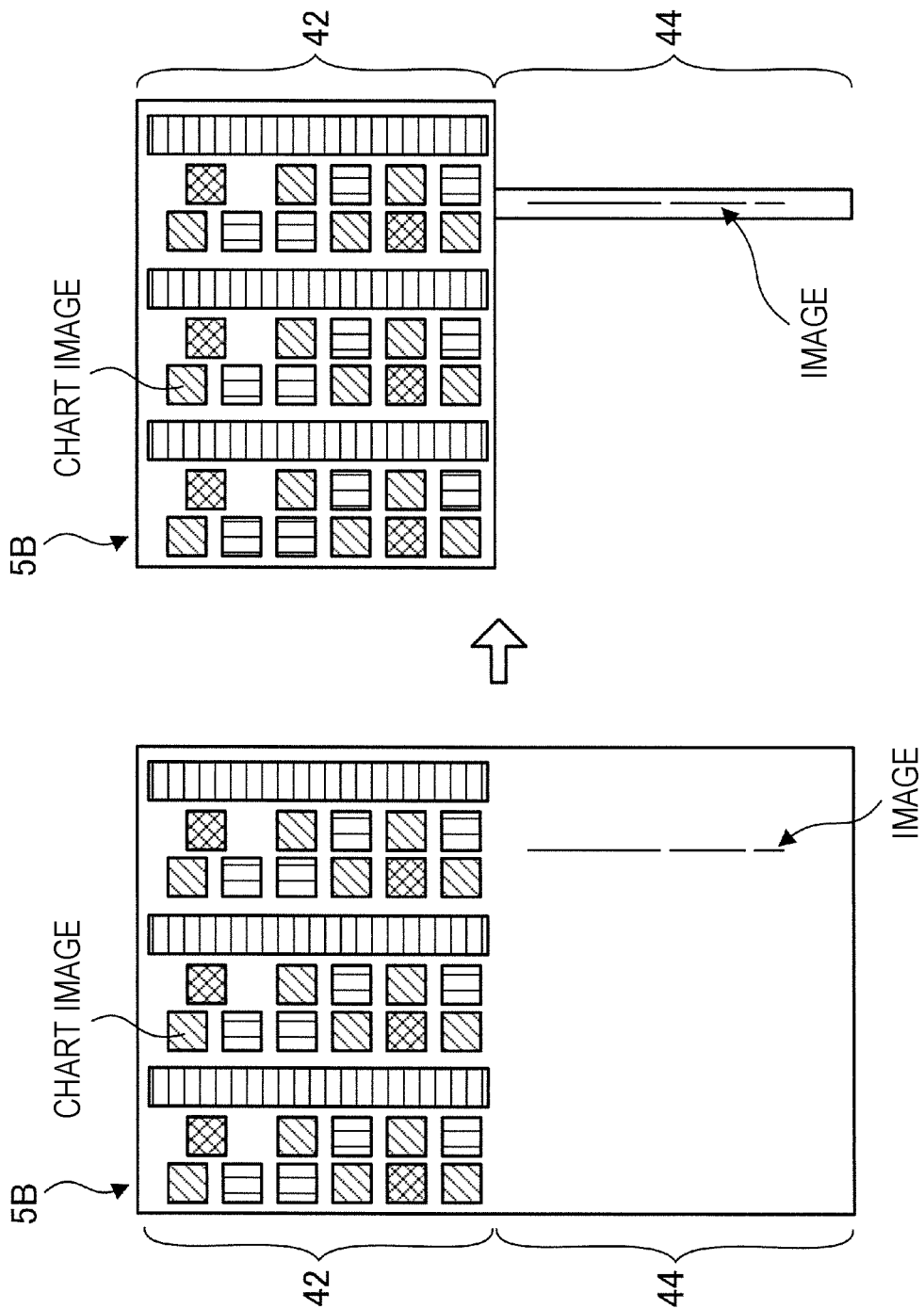
FIGS. 10A and 10B illustrate another example of the process performed on the read image data.

Referring to FIG. 5B, the image read portion 42 may be separated from the one specific portion 45. Referring to FIG. 10B as described below, a portion resulting from reading an image may be separated from the remaining portion of the non-formation read portion 44. In such a case, regardless of whether to combine images, positional information and rotation information may be attached to the portion. The portion with the positional information and rotation information attached thereto may be transmitted to the server apparatus 200.

The CPU 11a may acquire information on the image forming apparatus 100 having formed the chart image on the chart paper sheet CP (hereinafter referred to as "apparatus information") and may determine the one specific portion 45 that is to be acquired from the non-formation read portion 44 in accordance with the apparatus information.

In some cases, it may be desirable that the one specific portion 45 serving as an acquisition target is differentiated from image forming apparatus 100 to image forming apparatus 100. If the one specific portion 45 to be acquired from the non-formation read portion 44 is determined in accordance with the apparatus information, the one specific portion 45 may be different from image forming apparatus 100 to image forming apparatus 100.

The CPU 11a acquires, as the apparatus information, model identification information identifying the model of the image forming apparatus 100 and defect information related to a past defect on the image forming apparatus 100.

Based on the model identification information or defect information, the CPU 11a determines the one specific portion 45 acquired from the non-formation read portion 44.

The position of an image appearing within the non-formation portion 22 (see FIG. 4) may change depending on the model of the image forming apparatus 100.

If the one specific portion 45 is determined based on the model identification information on the image forming apparatus 100, it is more likely that the read image data acquired by reading an image that changes in generation position depending on the model of the image forming apparatus 100 is included in the one specific portion 45 and then transmitted to the server apparatus 200.

If the one specific portion 45 is determined based on the information on the past defect of the image forming apparatus 100, it is more likely that the read image data that results from reading an image that appears within the non-formation portion 22 because of the defect is included in the one specific portion 45 and then transmitted to the server apparatus 200.

The information on the chart paper sheet CP may be acquired and the one specific portion 45 to be acquired from the non-formation read portion 44 may be determined based on the information on the chart paper sheet CP.

Specifically, the information on the size of the chart paper sheet CP may be acquired and the one specific portion 45 to be acquired from the non-formation read portion 44 may be determined based on the size of the chart paper sheet CP.

The position of an image appearing within the non-formation portion 22 because of a defect on the image forming apparatus 100 may change in response to the size of the chart paper sheet CP. If the one specific portion 45 is determined in response to the size of the chart paper sheet CP, the position of the one specific portion 45 changes in response to a change in the size of the chart paper sheet CP.

In the same manner as described above, it is more likely that the read image data that results from reading the image that appears within the non-formation portion 22 because of the detect is included in the one specific portion 45 and then transmitted to the server apparatus 200.

In other words, it is more likely that reading results of the image appearing within the non-formation portion 22 because of the defect are included in the one specific portion 45.

FIGS. 6A and 6B and 7A and 7B illustrate another process example.

In the process example, in the same manner as described above, the chart paper sheet CP with the chart image of the A4 size formed on the paper sheet P of the A3 size is read. In this way, the read image data 5B of the A3 size illustrated in FIG. 6A is generated.

The process illustrated in FIG. 4 is performed herein. The chart paper sheet CP of the A3 size is generated. The chart paper sheet CP of the A3 size includes the formation portion 21 having the chart image formed thereon and the non-formation portion 22 having no chart image formed thereon.

The chart paper sheet CP is read by the image reading device 130. The read image data 5B of the A3 size illustrated in FIG. 6A is generated.

Figure 6B:
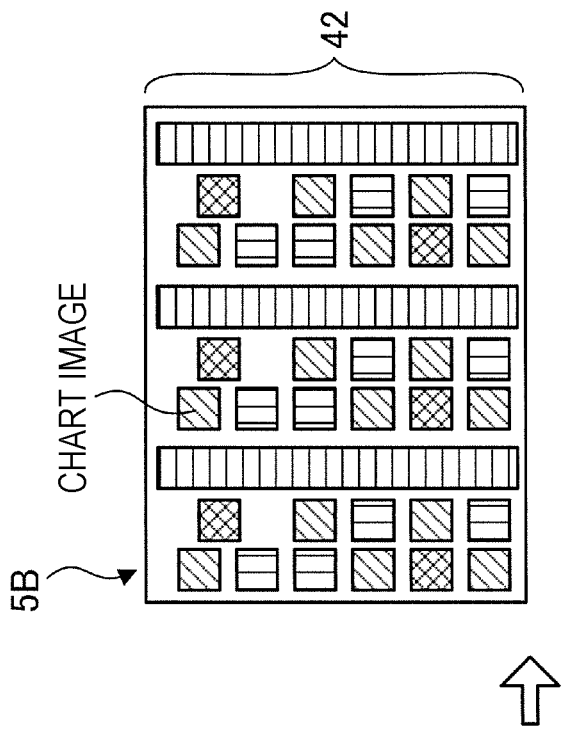
FIGS. 6A and 6B illustrate another process.
Figure 6A:
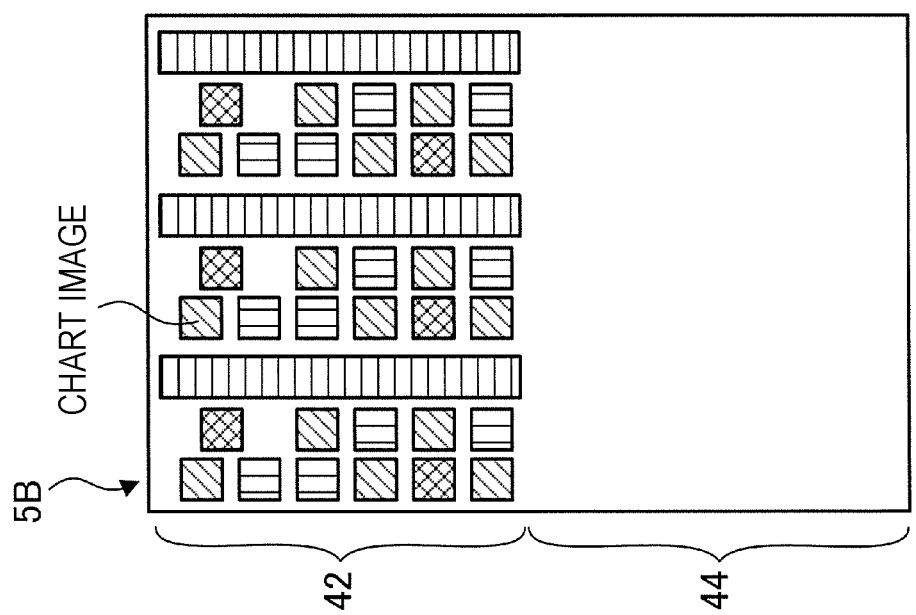

In this process example, the CPU 11a acquires the read image data 5B illustrated in FIG. 6A.

Specifically, the CPU 11a acquires the read image data 5B including the image read portion 42 and the non-formation read portion 44.

In this process example, the CPU 11a edits the read image data 5B in accordance with information on the non-formation read portion 44 of the read image data 5B.

If the information on the non-formation read portion 44 does not include the information indicating that an image is formed in the non-formation portion 22 (see FIG. 4), the CPU 11a deletes the non-formation read portion 44 included in the read image data 5B as illustrated in FIG. 6B.

When the read image data 5B is output to the server apparatus 200, the non-formation read portion 44 is not output.

As described above, all the non-formation read portion 44 included in the read image data 5B is deleted. Alternatively, part of the non-formation read portion 44 may be deleted to reduce the non-formation read portion 44 included in the read image data 5B.

For example, a portion corresponding to the one specific portion 45 of the non-formation read portion 44 (see FIG. 5B) remains intact with the remaining portion of the non-formation read portion 44 deleted. In such a case, an amount of information on the non-formation read portion 44 included in the read image data 5B and transmitted to the server apparatus 200 is reduced.

Figure 7A:
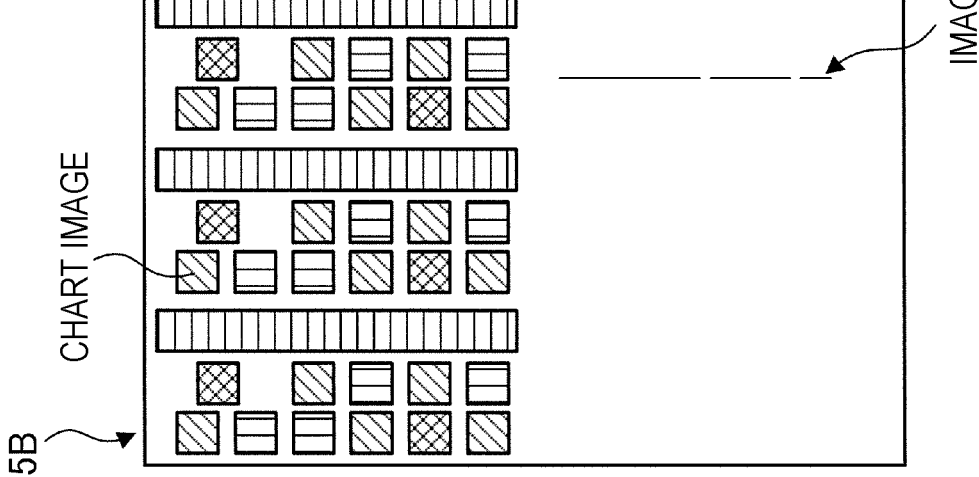
FIGS. 7A and 7B illustrate another process.

An image may be formed in the non-formation portion 22 of the chart paper sheet CP (see FIG. 4) and the information on the non-formation read portion 44 may include information indicating that the image is formed as illustrated in FIG. 7A. In such a case, the CPU 11a neither deletes nor reduces the non-formation read portion 44.

Figure 7B:
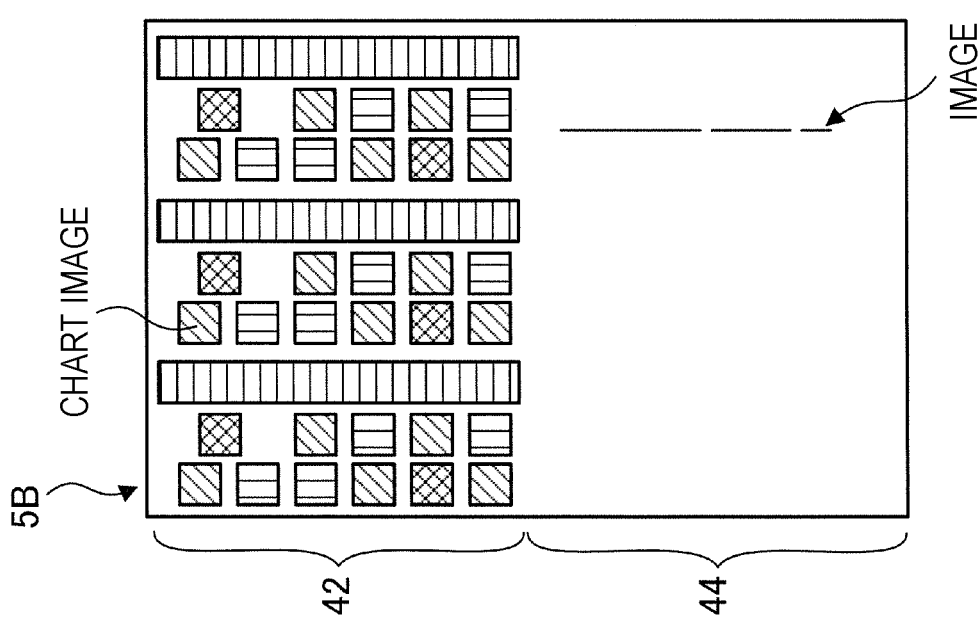

The read image data 5B remains intact as illustrated in FIG. 7B. All the read image data 5B is output to the server apparatus 200.

In other words, the image read portion 42 that results from reading the chart image and the non-formation read portion 44 that results from reading the non-formation portion 22 are output to the server apparatus 200.

In the process example, the CPU 11a analyzes the non-formation read portion 44 of the read image data 5B (see FIG. 7A) and then detects the state of the non-formation read portion 44.

In the process example, if the non-formation read portion 44 is in the state that an image is read as illustrated in FIG. 7A, all the read image data 5B is transmitted to the server apparatus 200.

On the other hand, if the non-formation read portion 44 is in the state that an image is not read as illustrated in FIG. 6A, only the image read portion 42 of the read image data 5B is transmitted to the server apparatus 200.

By analyzing the non-formation read portion 44 (see FIG. 7A), the CPU 11a determines whether the image is formed in the non-formation portion 22 (see FIG. 4).

Figure 8:
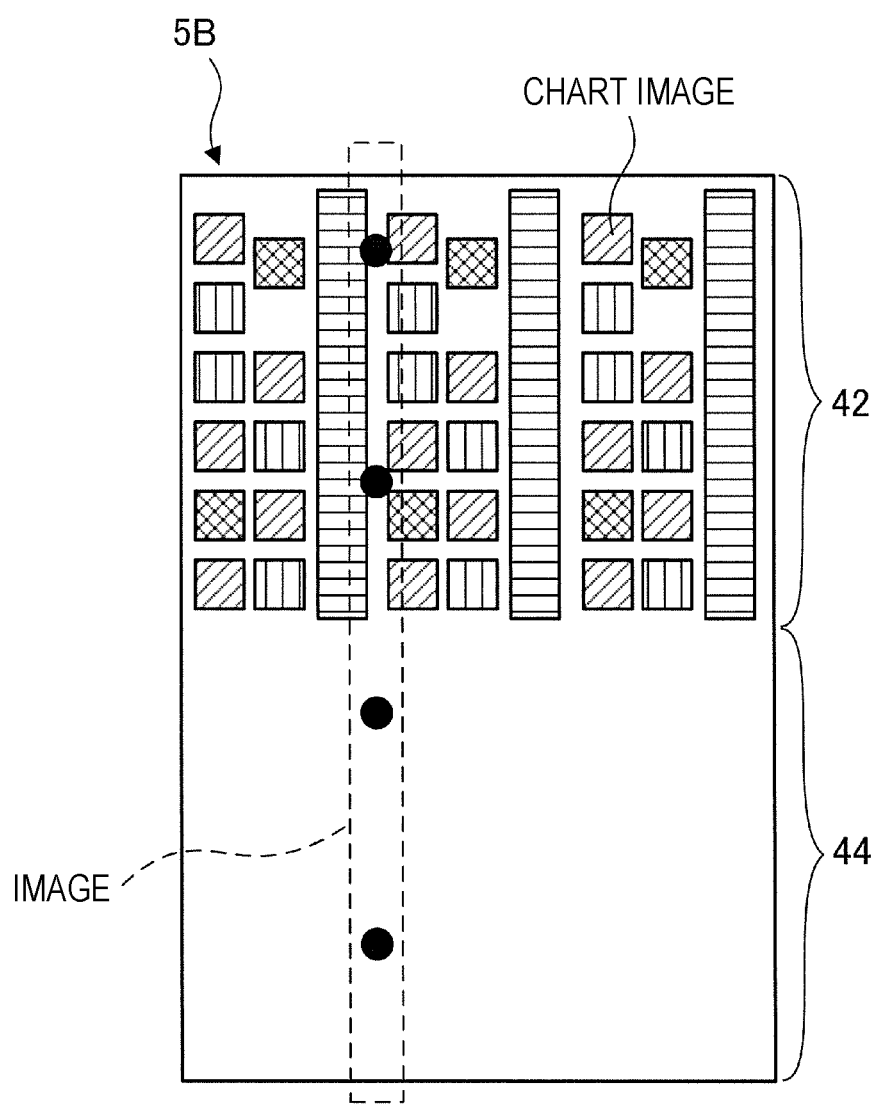
FIG. 8 illustrates an example of read image data.

The CPU 11a analyzes the non-formation read portion 44 to determine whether the non-formation portion 22 includes an image of streaks created by a defect on the image forming unit 100A, an image of dots occurring at equally spaced intervals (see FIG. 8), or an image of smears occurring in the trailing end portion KT of the chart paper sheet CP.

Upon determining that no image is created in the non-formation portion 22, the CPU 11a deletes the non-formation read portion 44.

In this case, the non-formation read portion 44 is not output to the non-formation read portion 44 and an amount of information to be output to the server apparatus 200 is reduced.

If the CPU 11a determines that the image is formed in the non-formation portion 22, the CPU 11a does not delete the non-formation read portion 44.

The read image data 5B on the whole page of the chart paper sheet CP is transmitted to the server apparatus 200. In other words, all the read image data 5B is transmitted to the server apparatus 200.

Specifically, both the image read portion 42 and the non-formation read portion 44 are transmitted to the server apparatus 200.

The state of the non-formation read portion 44 is detected by referencing a pixel value of each pixel forming the non-formation read portion 44. Specifically, the CPU 11a references the pixel value of each pixel forming the non-formation read portion 44 to determine whether the image is formed in the non-formation portion 22.

According to the exemplary embodiment, if the pixel value of each pixel in an area exceeds a predetermined threshold, the CPU 11a determines that the image is formed in the non-formation portion 22. If the pixel value of each pixel is not higher than the predetermined threshold value, the CPU 11a determines that the image is not formed in the non-formation portion 22.

Figure 9:
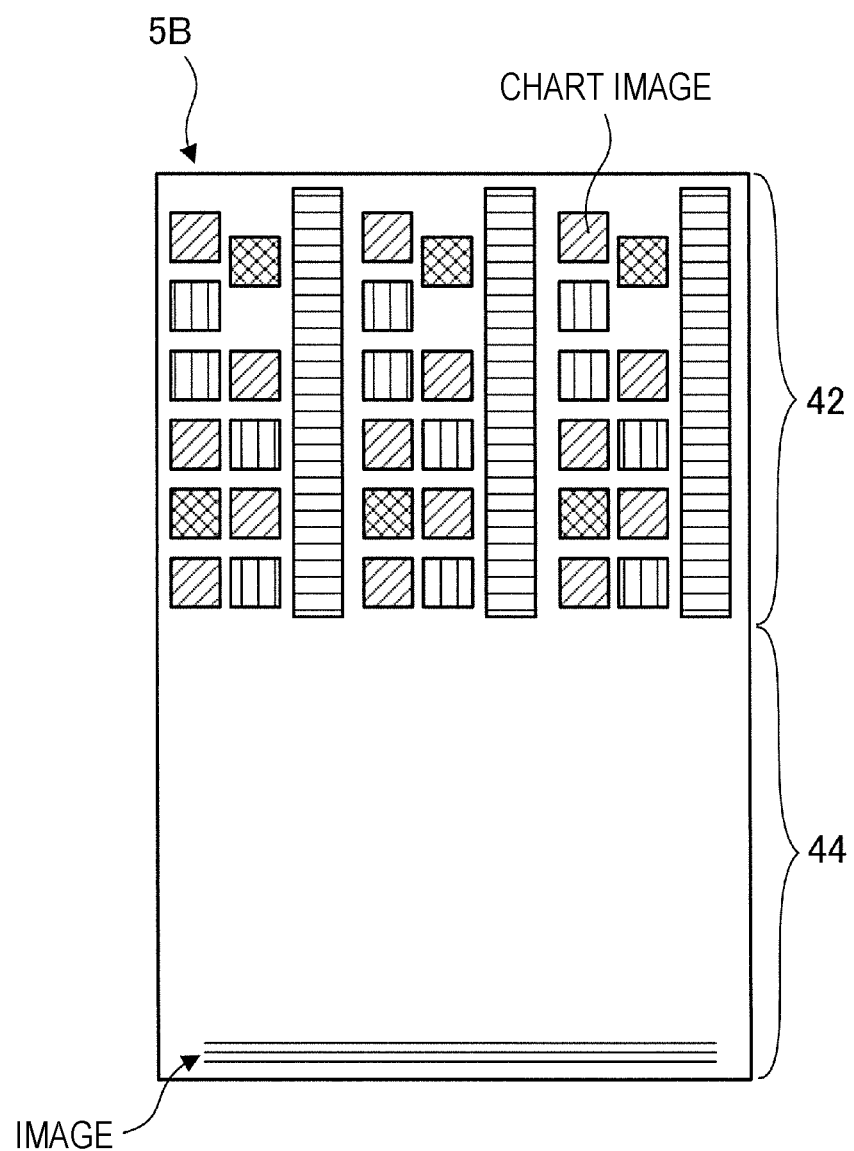
FIG. 9 illustrates another example of the read image data.

FIG. 9 illustrates another example of the read image data 5B.

Referring to FIG. 9, an image is present in a portion that results from reading the trailing end portion KT of the chart paper sheet CP (see FIG. 4) of the non-formation read portion 44.

In this process example, the non-formation read portion 44 is not deleted and all the read image data 5B is transmitted to the server apparatus 200.

If the information on the non-formation read portion 44 includes information indicating that the image is formed in the non-formation portion 22, the CPU 11a may delete part of the non-formation read portion 44.

Specifically, as illustrated in FIGS. 10A and 10B (illustrating another process performed on the read image data 5B), the CPU 11a may cause to remain intact a portion that results from reading the non-formation portion 22 of the non-formation read portion 44 and delete the remaining portion of the non-formation read portion 44.

The portion of the non-formation read portion 44 resulting from reading the image is output to the server apparatus 200 and the portion not resulting from reading the image is not output to the server apparatus 200.

In the process described above, the read image data resulting from reading the image caused by a defect on the image forming apparatus 100 is included in the read image data 5B.

A server and a maintenance engineer diagnose the image forming apparatus 100 and image reading device 130 in accordance with the read image data 5B that includes the read image data resulting from reading the image caused by the defect.

On the other hand, if no image is formed in the non-formation portion 22, only the image read portion 42 serving as the read image data on the chart image is transmitted to the server apparatus 200. In this case, the amount of information to be transmitted to the server apparatus 200 is smaller.

Figure 11:
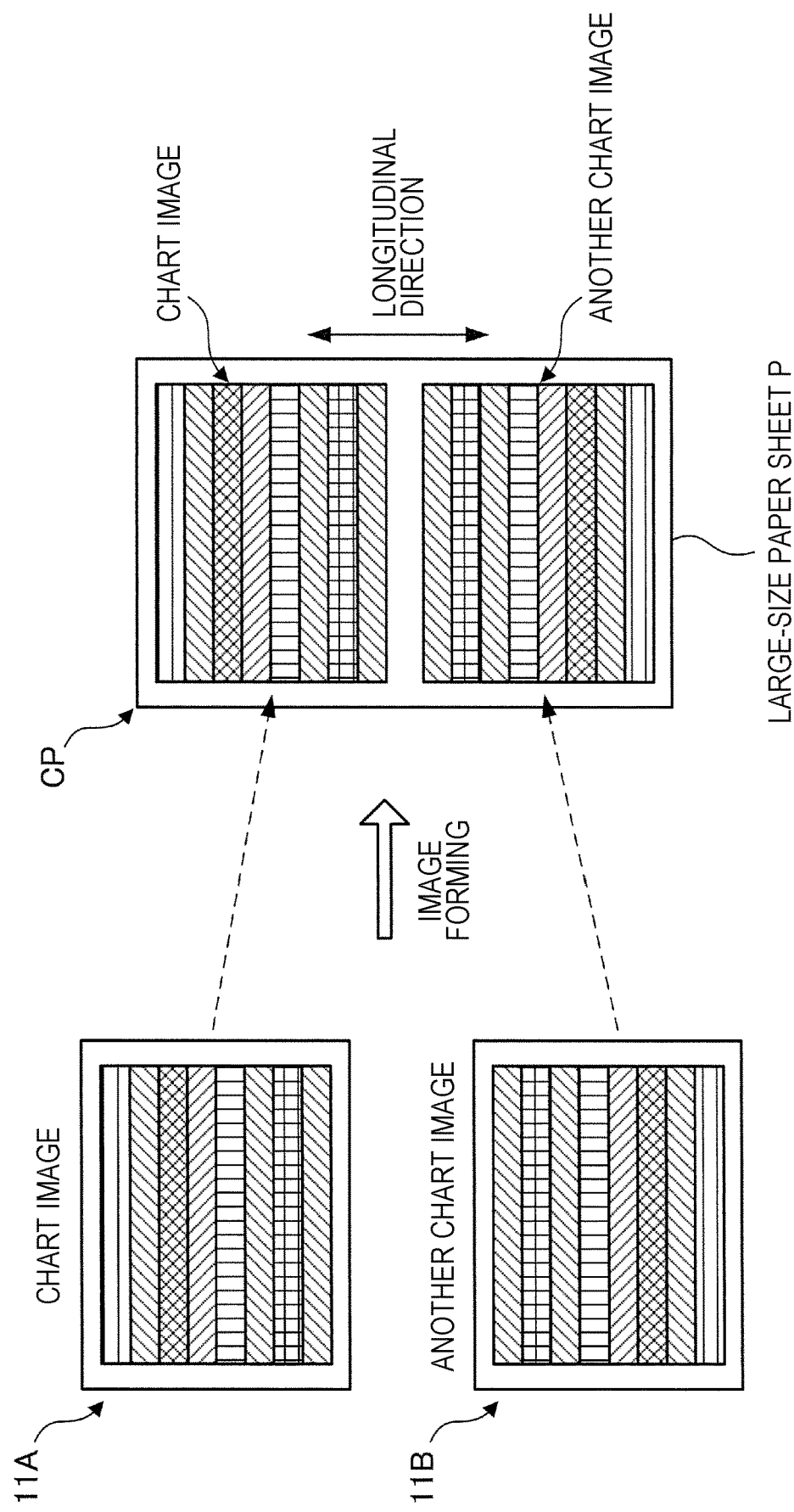
FIG. 11 illustrates another example of the process.

FIG. 11 illustrates another process example.

In this process example, an edit process of the chart image used to generate the chart paper sheet CP is performed.

In this process example, the CPU 11a acquires one chart image 11A stored on the auxiliary memory 12. Specifically, the CPU 11a acquires one piece of image data serving as a base of the chart image stored on the auxiliary memory 12.

If a chart image is formed on the large-sized paper sheet P of the specific size larger than the acquired one chart image, the CPU 11a forms multiple chart images on the large-sized paper sheet P.

Specifically, the CPU 11a causes the acquired one chart image and another chart image different from the one chart image to be formed on the large-sized paper sheet P as illustrated in FIG. 11.

Specifically, the CPU 11a reads and acquires another chart image 11B from the auxiliary memory 12 in addition to the one chart image from the auxiliary memory 12.

The CPU 11a outputs the one chart image and the other chart image to the image forming unit 100A (see FIG. 3) such that the one chart image and the other chart image are formed on the large-sized paper sheet P.

In this process example, the one chart image is different from the other chart image. When multiple chart images are formed on the large-sized paper sheet P, the CPU 11a causes the mutually different chart images to be formed on the large-sized paper sheet P.

According to the exemplary embodiment, when the one chart image and the other chart image are formed on the large-sized paper sheet P, the CPU 11a arranges the one chart image and the other chart image along the longitudinal direction of the large-sized paper sheet P.

According to the exemplary embodiment, to form the chart images on small-sized paper sheets P (not illustrated) smaller than the large-sized paper sheet P, the CPU 11a causes the chart images to be formed on the small-sized paper sheets P that are different from each other in size.

According to the exemplary embodiment, if the chart images are formed on the large-sized paper sheet P, the chart images originally to be formed on the small-sized paper sheets P are formed on the common large-sized paper sheet P.

Specifically, in the process example illustrated in FIG. 11, the one chart image of the A4 size may be formed on the paper sheet P of the A3 size larger than the A4 size.

In such a case, the chart image is edited such that the image data serving as a base of the chart image formed on the large-sized paper sheet P includes multiple chart images. Specifically, the image data serving as the base for the chart image formed on the large-sized paper sheet P includes the one chart image and the other chart image.

One chart paper sheet CP of the A3 size includes the one chart image and the other chart image and the multiple chart images are thus formed.

According to the exemplary embodiment, if the chart image of the A4 size is generated on the large-sized paper sheet P of the A3 size serving as an example of a specific size, the CPU 11a causes multiple chart images of the A4 size to be formed on the paper sheet P of the A3 size.

Specifically, according to the exemplary embodiment, if the area of the large-sized paper sheet P is equal to or larger than twice the area of the chart image, the CPU 11a causes multiple chart images to be formed on the large-sized paper sheet P.

According to the exemplary embodiment, the area of the large-sized paper sheet P of the A3 size is twice as large as the area of the chart image of the A4 size. The CPU 11a causes multiple chart images of the A4 size to be formed on the paper sheet P of the A3 size.

The multiple chart images are thus formed on a single large-sized paper sheet P without contracting each chart image.

The above-described process may reduce the amount of information to be transmitted to the server apparatus 200 in comparison with when the chart images of the A4 size are respectively formed on the paper sheets P of the A3 size.

In other words, the process may reduce the read image data 5B to be transmitted to the server apparatus 200 in comparison with when one chart image of the A4 size is formed on one paper sheet P of the A3 size.

In the process illustrated in FIG. 11, the non-formation read portion 44 is not included in the read image data 5B (not illustrated in FIG. 11). With the non-formation read portion 44 not included, the amount of information to be transmitted to the server apparatus 200 is smaller.

In the process illustrated in FIG. 11, a total amount of information to be transmitted to the server apparatus 200 is half as much as when each chart image of the A4 size is formed each paper sheet P of the A3 size.

For example, when a chart image of the A4 size is formed on a paper sheet P of the A3 size, the read image data 5B with the non-formation read portion 44 deleted may be transmitted to the server apparatus 200.

In such a case, the size of the read image data 5B to be transmitted to the server apparatus 200 becomes smaller. The server apparatus 200 has a difficulty in detecting an image 12A that is periodic and extends in the longitudinal direction of the chart paper sheet CP of the A3 size in FIG. 12 (illustrating another example of the chart image).

Figure 12:
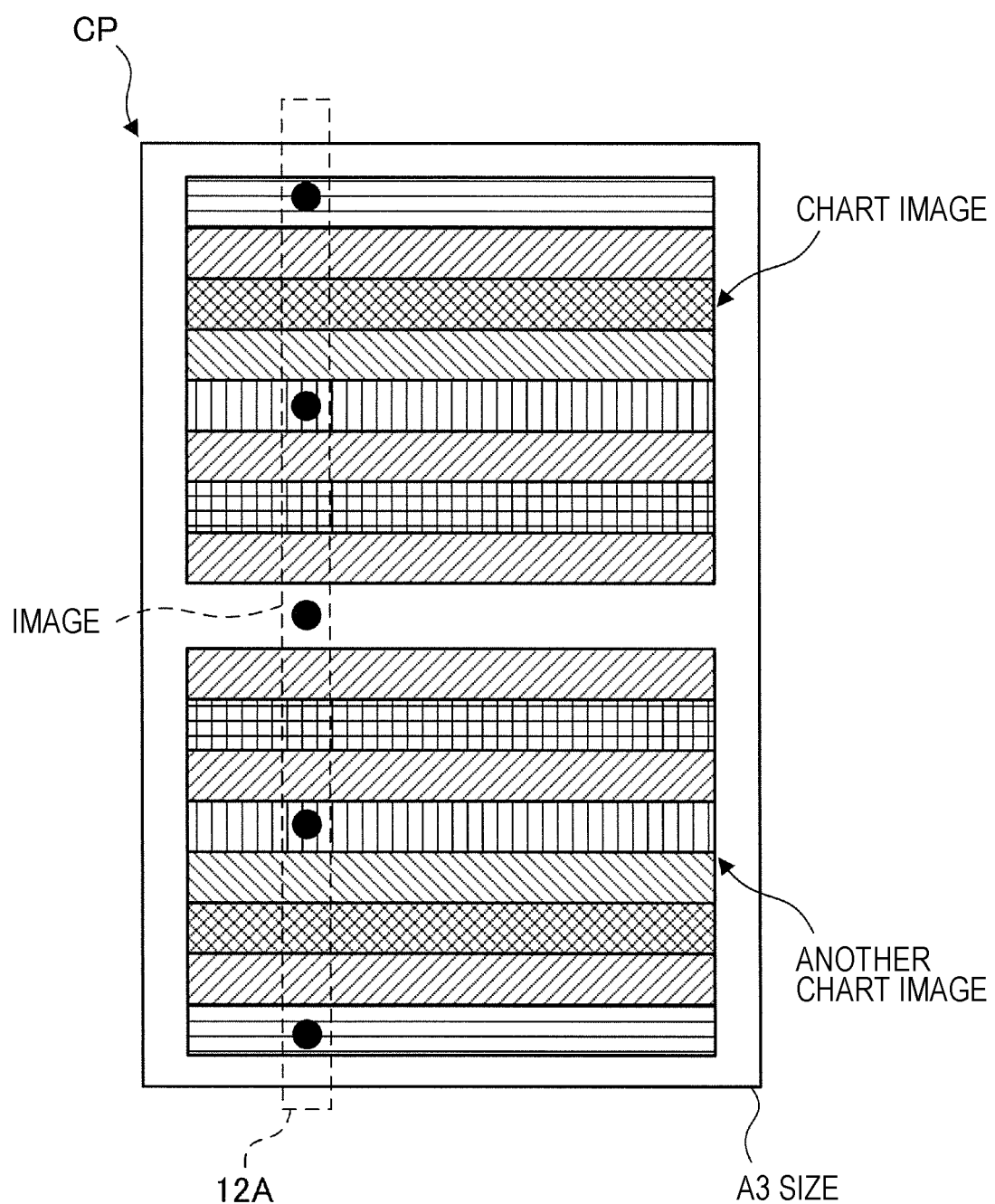
FIG. 12 illustrates an example of a chart sheet.

If the chart paper sheet CP is generated with a defect in the image forming unit 100A in the image forming apparatus 100, an image that is periodic and extends in the longitudinal direction of the chart paper sheet CP may be formed as illustrated in FIG. 12.

If the non-formation read portion 44 is deleted, part of the image is missing. The server apparatus 200 has a difficulty in detecting the periodic image.

In contrast, the process of the exemplary embodiment may be free from the occurrence of the missing part of the periodic image. The server apparatus 200 may detect the image more easily.

When the read image data 5B is transmitted to the server apparatus 200 with the non-formation read portion 44 deleted, the image likely to appear in the trailing end portion KT of the paper sheet P is not included in the read image data 5B.

In contrast, in the process illustrated in FIG. 11, if the image has occurred in the trailing end portion KT of the chart paper sheet CP, the read image data of the image is not deleted but included in the read image data 5B.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
an image former forming an image on a recording medium; and
a processor configured to:
acquire a diagnostic image used to diagnose the image forming apparatus; and
if the diagnostic image is formed on a large-sized recording medium of a specific size larger than the diagnostic image, form a plurality of the diagnostic images on the large-sized recording medium,
wherein if the diagnostic images used to diagnose the image forming apparatus are to be formed on small-sized recording media, each small-sized recording medium smaller than the large-sized recording medium, the diagnostic images are respectively formed on the small-sized recording media different from each other in size, and
wherein the processor is configured to, if a plurality of the diagnostic images are to be formed on the large-sized recording medium, form the diagnostic images on the large-sized recording medium such that the diagnostic images intended to be respectively formed on the small-sized recording media different from each other in size are formed together on the large-sized recording medium.

2. The image forming apparatus according to claim 1, wherein the processor is configured to, if the diagnostic images are to be formed on the large-sized recording medium, form on the large-sized recording medium a first diagnostic image as the diagnostic image and a second diagnostic image different from the first diagnostic image.

3. The image forming apparatus according to claim 1, wherein the processor is configured to, if a plurality of the diagnostic images are to be formed on the large-sized recording medium, form the diagnostic images different from each other in size on the large-sized recording medium.

4. The image forming apparatus according to claim 1, wherein the processor is configured to form the diagnostic images on the large-sized recording medium such that the diagnostic images are arranged along a longitudinal direction of the large-sized recording medium.

* * * * *